(12) United States Patent
Shklyar et al.

(10) Patent No.: US 11,849,099 B2
(45) Date of Patent: Dec. 19, 2023

(54) MULTI-VIEW IMAGE FUSION BY IMAGE SPACE EQUALIZATION AND STEREO-BASED RECTIFICATION FROM TWO DIFFERENT CAMERAS

(71) Applicant: TriEye Ltd., Tel Aviv (IL)

(72) Inventors: Roman Shklyar, Tel Aviv (IL); Uriel Levy, Tel Aviv (IL); Roni Dobrinsky, Tel Aviv (IL); Omer Kapach, Tel Aviv (IL); Avraham Bakal, Tel Aviv (IL)

(73) Assignee: TriEye Ltd., Tel Aviv (IL)

( * ) Notice: Subject to any disclaimer, the term of this patent is extended or adjusted under 35 U.S.C. 154(b) by 106 days.

(21) Appl. No.: 17/638,809

(22) PCT Filed: Sep. 2, 2019

(86) PCT No.: PCT/IB2019/057391
§ 371 (c)(1),
(2) Date: Feb. 26, 2022

(87) PCT Pub. No.: WO2021/044186
PCT Pub. Date: Mar. 11, 2021

(65) Prior Publication Data
US 2022/0377307 A1  Nov. 24, 2022

(51) Int. Cl.
*H04N 13/133* (2018.01)
*G06T 7/80* (2017.01)
*G06T 7/30* (2017.01)
*H04N 13/156* (2018.01)
*H04N 13/122* (2018.01)
*G06T 3/40* (2006.01)
*H04N 23/11* (2023.01)

(52) U.S. Cl.
CPC ............. *H04N 13/133* (2018.05); *G06T 3/40* (2013.01); *G06T 7/30* (2017.01); *G06T 7/85* (2017.01); *H04N 13/122* (2018.05); *H04N 13/156* (2018.05); *H04N 23/11* (2023.01); *G06T 2207/10012* (2013.01); *G06T 2207/10024* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2008/0175507 A1* | 7/2008 | Lookingbill | ........... | G06V 20/63 382/255 |
| 2014/0267614 A1* | 9/2014 | Ding | ........... | H04N 13/275 348/46 |
| 2019/0149721 A1* | 5/2019 | Shabtay | ........... | H04N 23/13 348/350 |

* cited by examiner

*Primary Examiner* — Xiaolan Xu
(74) *Attorney, Agent, or Firm* — Nathan & Associates; Menachem Nathan

(57) ABSTRACT

Methods to solve the problem of performing fusion of images acquired with two cameras with different type sensors, for example a visible (VIS) digital camera and an short wave infrared (SWIR) camera, include performing image space equalization on images acquired with the different type sensors before performing rectification and registration of such images in a fusion process.

7 Claims, 5 Drawing Sheets

---

Calculate coordinates of each pixel in the sensor space of a pin-hole model of CameraR    402

↓

Transform the sensor space of CameraL into the image space of CameraR    404

↓

Set up the positions of the image pixels of CameraL in the image space of CameraR to obtain space equalized images    406

(a) (b)

MULTI-VIEW IMAGE FUSION BY IMAGE SPACE EQUALIZATION AND STEREO-BASED RECTIFICATION FROM TWO DIFFERENT CAMERAS

CROSS REFERENCE TO RELATED APPLICATIONS

This is a 371 application from international patent application No. PCT/IB2019/057391 filed Sep. 2, 2019.

FIELD

Embodiments disclosed herein relate in general to cameras and in particular to image processing in dual-cameras with different type sensors.

BACKGROUND

The term "fusion" means in general an approach to extraction of information acquired in several domains. In work with images (e.g. in photography), the goal of "image fusion" (IF) is to integrate complementary multi-sensor, multitemporal and/or multi-view information into one new image containing information with a quality that cannot be achieved otherwise. The term "quality", its meaning and its measurement depend on the particular application.

Existing fusion methods (wavelets transforms, statistical approaches (e. g. principal component analysis or "PCA"), Multi Scale Decomposition ("MSD) and others) need to be performed on a pair of registered images from the same image space. Several known approaches deal with the problem of having inputs for fusion from distinct sensors (e.g. image sensor of two (or "dual") cameras), based on cost computation methods, such as histogram of oriented gradients (HOG), connected component labeling (CCL), image statistical methods, etc. These approaches work well if the two cameras are identical, having the same optics and capturing the same image. However, when different type sensors are used, they provide different image properties, significantly reducing the practicality of these approaches. Therefore, in fusion, based on inputs from different type sensors, one may observe a degraded image. For example, a ghost image may appear on top of the real image.

The ghost image problem has known solutions. However, known solutions to this problem require heavy computational power, sometimes even requiring a graphic processing unit (GPU).

SUMMARY

Embodiments disclosed herein provide approaches (methods) to solve the problem of performing fusion of images acquired with two cameras with different type sensors, for example a visible (VIS) digital camera and an short wave infrared (SWIR) camera, with smaller complexity and/or computation power than required by known fusion techniques. Such approaches also solve the problem of ghost images. An exemplary approach includes performing Image Space Equalization (ISE) on images acquired with the different type sensors before performing rectification and registration of such images in a fusion process.

In exemplary embodiments, there are disclosed methods for fusing images from two different cameras, a first camera and a second camera, comprising: performing a transformation that translates the image space of the first camera onto the image space of the second camera to obtain a stereo rig in the form of a pair of space equalized images; performing rectification on the pair of space equalized images to obtain rectified first and second images; performing registration on the rectified first and second images to obtain registered first and second images; and fusing the registered first and second images into a fused image.

In an embodiment, the first camera has a first image sensor with a first resolution, the second camera has a second image sensor with a second resolution and the first resolution is higher than the second resolution.

In various embodiments, the first camera differs from the second camera in at least one parameter selected from focal length, sensor resolution, distortion, gain and spectral range.

In various embodiments, the performing a transformation that translates the image space of the first camera onto the image space of the second camera includes calculating coordinates of each pixel in the sensor space of a pin-hole model of the second camera, transforming a sensor space of the first camera into an image space of the second camera, and setting up the positions of image pixels of the first camera in the image space of the second camera to obtain the space equalized images.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure may be labeled with a same numeral in all the figures in which they appear. The drawings and descriptions are meant to illuminate and clarify embodiments disclosed herein, and should not be considered limiting in any way.

DETAILED DESCRIPTION

If the two cameras are identical, the rectification process is well known. However, assume a more general case in which the cameras are different. Specifically, assume two distinct cameras with different focal lengths, different sensor resolutions, different principal point displacement, different distortion and possibly different gain and spectral range. As used herein, the term "different cameras" reflects the fact that the cameras providing images to be fused into a fused image differ from each other in at least one parameter chosen from focal lengths, sensor resolutions, distortion, gain and spectral range. In some embodiments, the parameter by which different cameras differ may also be principal point position.

For example, assume two cameras, a "left camera" (or "first camera") CameraL and a "right camera" (or "second camera") CameraR, where one camera (e.g. CameraL) operates in the VIS spectral regime while the other (e.g. CameraR) works in the SWIR spectral regime. CameraL has the following intrinsic parameters: focal length $F_1$, principal point $c_L(p_L, q_L)$, radial distortion coefficients $[K_1^L, K_2^L, K_3^L]$ and tangential distortion $[T_1^L, T_2^L]$. CameraR has the following intrinsic parameters: focal length $F_2$, principal point $c_R(p_R, q_R)$, radial distortion coefficients $[K_1^R, K_2^R, K_3^R]$ and tangential distortion $[T_1^R, T_2^R]$.

Figure 1:
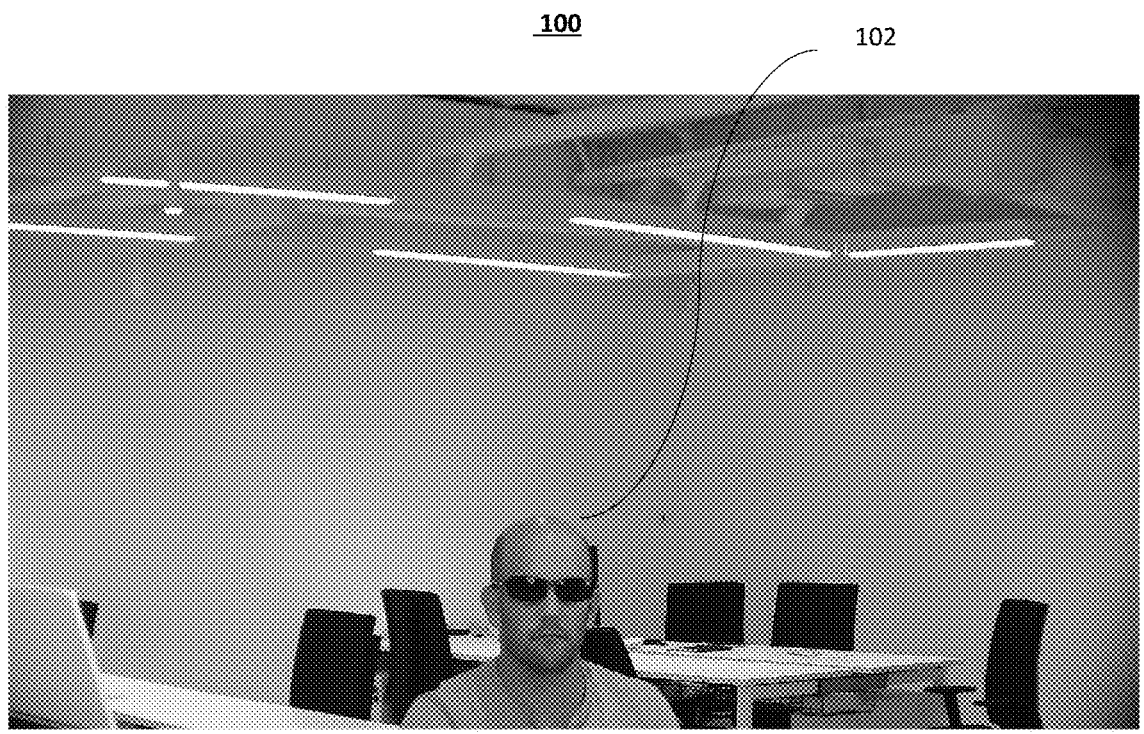
FIG. 1 shows an image of a scene captured by a visible (VIS) camera with a variable focal length of 4.5-13.2 mm and having a 1080×1920 pixel image sensor with 4.08 nm pixel size (width and height)
Figure 2:
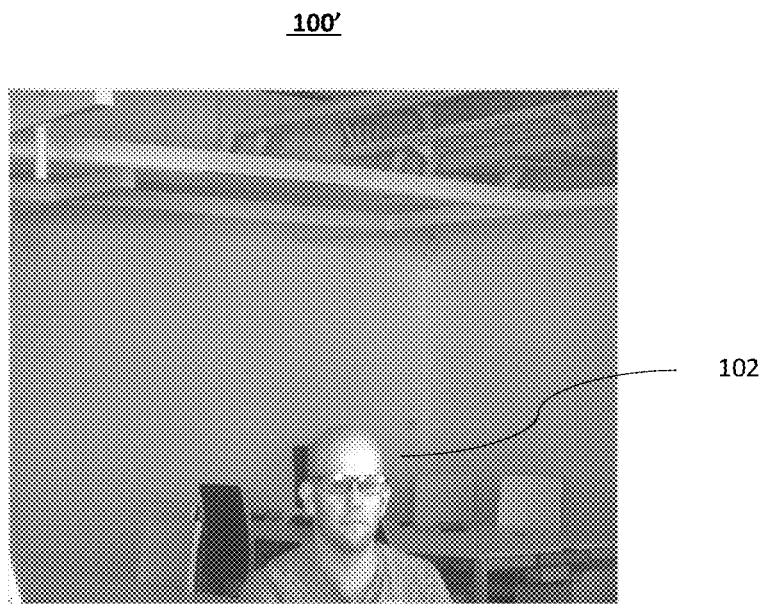
FIG. 2 shows an image of the same scene captured by a short wave IR (SWIR) camera with a fixed focal length of 35 mm and having a 512×640 pixel image sensor with 15 nm pixel size.

In an example, FIG. 1 shows an image 100 of a scene captured by a VIS camera with a variable focal length of 4.5-13.2 mm and having a 1080×1920 pixel image sensor with 4.08 nm pixel size. FIG. 2 shows an image 100' of the same scene captured by a SWIR camera with a fixed focal length of 35 mm and having a 512×640 pixel image sensor with 15 nm pixel size. Both images show a person with a head 102. The task is to build a transformation that translates the image space of the first camera onto the image space of the second camera to obtain a stereo rig of as would be obtained with two cameras with same focal length, sensor properties and distortion coefficients.

Figure 3:
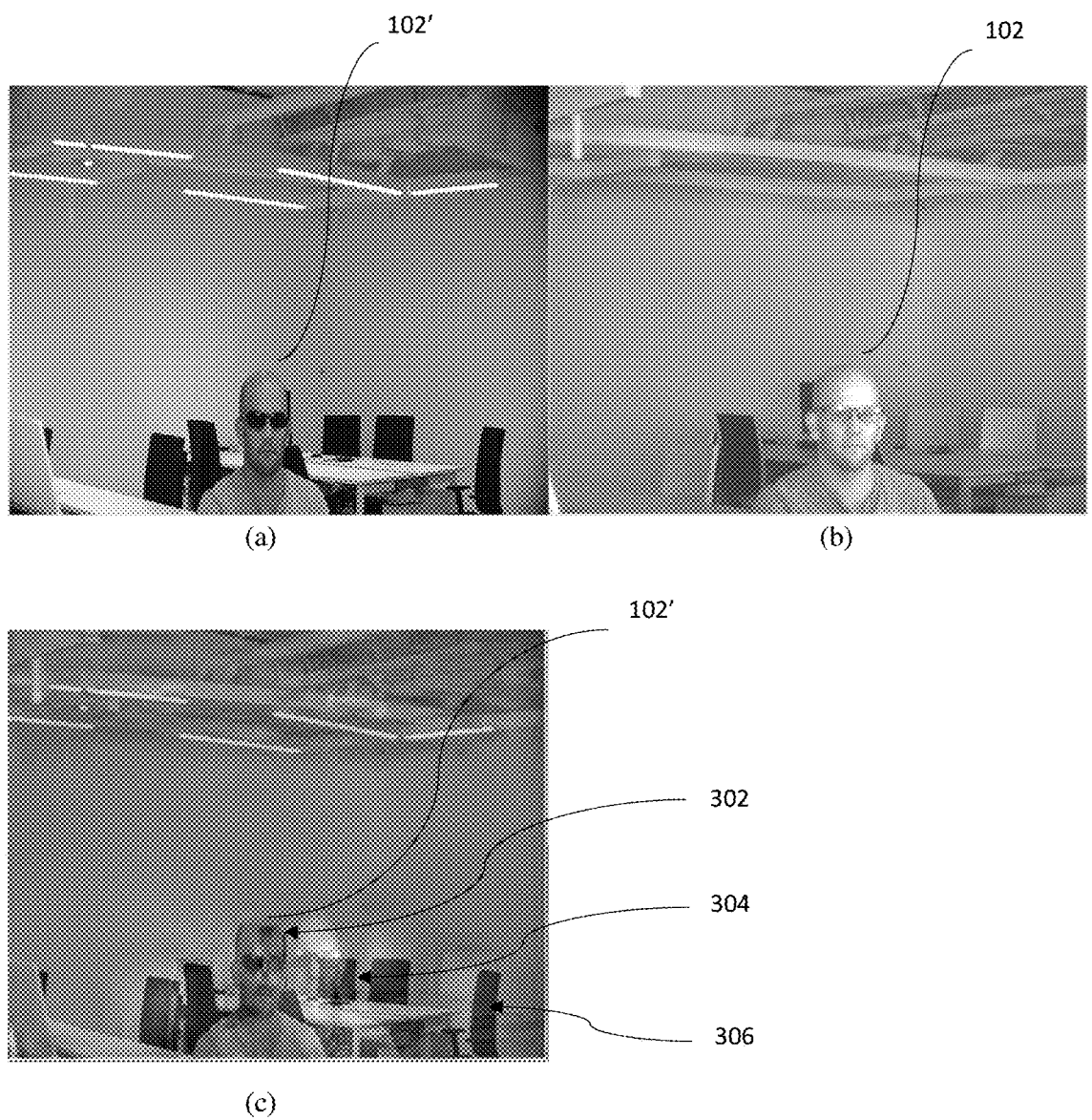
FIG. 3 shows in (a) an image obtained from the resizing of dimensions 1080×1920 of the VIS image of FIG. 1 to 512×640 and in (b) SWIR image of FIG. 2.

FIG. 3 shows a scene capture by a stereo rig of VIS CameraL and SWIR CameraR. FIG. 3 shows in (a) image 100 (with a head 102') obtained from the resizing of dimensions 1080×1920 of the VIS image of FIG. 1 to dimensions 512×640 of SWIR image, and in (b) the SWIR image of FIG. 2. However, if we only resize the dimensions of the image of CameraL in FIG. 3(a) to the dimensions of the image of CameraR in FIG. 3(b), as done in a known typical fusion process, true fusion will not be obtained because of wrong representation of the resized objects from the CameraL in the image space of CameraR. As seen, there is a significant distortion in the left (CameraL) figure. For example, head 102' in (a) has an elliptic form with much more eccentricity than head 102 in (b). In addition, one may easily observe ghost images, FIG. 3 (c). Thus, the task is to make the left image in FIG. 3(a) look similar to the original image in FIG. 2 so that the structure similarity index (SSIM) will be as close as possible to 100%. To achieve this goal, it is proposed herein to perform an "image space equalization" (ISE) process before applying fusion, to obtain a ghost-free image after fusion regardless of the chosen fusion method. To emphasize, performing ISE as disclosed herein removes the need for ghost "cleaning" processes now used in known art to reach the same result.

Image Space Equalization

Figure 4:
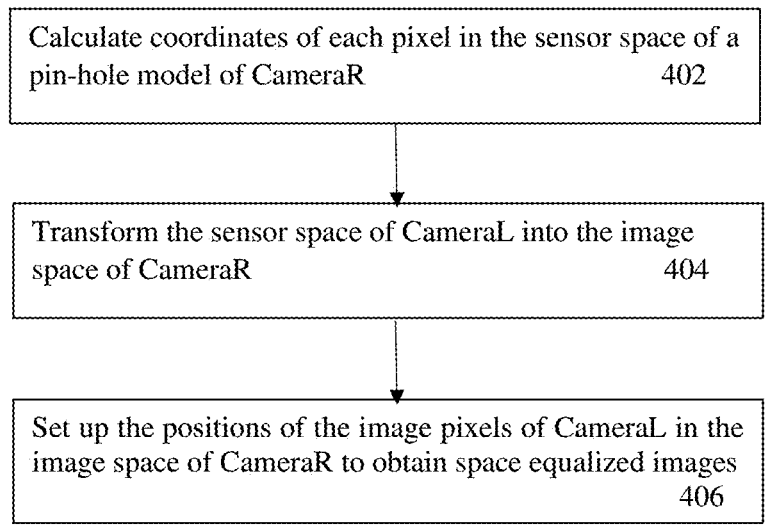
FIG. 4 shows in a flow chart main steps in an ISE process disclosed herein.

We construct a lookup table that transfers the positions of all the sensor pixels from the image sensor of CameraL to the sensor pixels of the image sensor of CameraR. This represents a transform from a sensor with bigger (higher) resolution into a sensor with smaller (lower) resolution. First we define a scaling factor for the dimensions $$d = \left[\frac{H_L}{H_R}, \frac{W_L}{W_R}\right]$$

where the $H_L$, $W_L$, $H_R$, $W_R$ the height and width of the left and right sensor respectively. Next, we build the lookup table for CameraR using the following procedure, FIG. 4.

Assume that each image sensor has a width dimension in direction X and a height dimension in direction Y. Step 402 receives as inputs the intrinsic parameters of CameraL and CameraR and images captured by both cameras. In step 402, calculate coordinates x, y of each pixel in the sensor space of a pin-hole model of the CameraR as follows:

$$x = \frac{x_R - p_R}{F_R}, y = \frac{y_R - q_R}{F_R}$$

where $p_R$, $q_R$ are the pixel positions (in mm) of the principal point in horizontal and the vertical direction and $F_R$ is the pixel relative focal length.

In step 404 and using coordinates x, y of each pixel in the sensor of CameraL, we transform the sensor space of the CameraL into the image space of the CameraR. That is, the scene imaged by CameraR is as if CameraR is mounted on the position of CameraL. This is performed by defining a transformation $(x_R, y_R) \rightarrow (u, v)$ in the following way:

$$u(x_R) = p_R + \frac{x * F_L}{d(1)} = p_R + \frac{(x_R - p_R) \cdot F_L}{F_R d(1)}$$

$$v(y_R) = q_R + \frac{y * F_L}{d(2)} = q_R + \frac{(y_R - q_R) \cdot F_L}{F_R \cdot d(2)}$$

where $u(x_R)$, $v(x_R)$ are the new pixel positions in CameraL and $$d(1) = \frac{H_L}{H_R}, d(2) = \frac{W_L}{W_R}.$$

The result is a look-up table of pixel positions in the image (transformed from the sensor of CameraL to the image obtained by CameraR).

Figure 5:
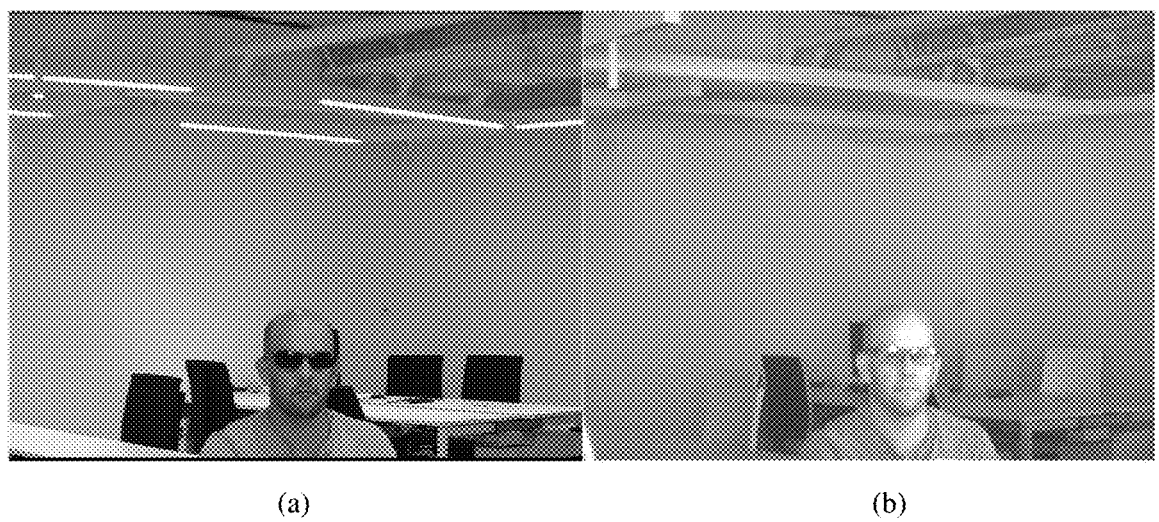
FIG. 5 shows the images of FIG. 3 after image space equalization.

In step 406, using the information in the look-up table, set up the positions of the image pixels of CameraL in the image space of CameraR as follows:

$$\text{Image}_{Left}^{New}(i,j) = \text{Image}_{Left}^{Old}(u(i), v(j)) \text{ for all } i,j$$
pixel positions of CameraR.

where $\text{Image}_{Left}^{New}$ is the image from the image space of the CameraL represented in the image space of the CameraR without distortion correction, see FIG. 5. The output of step 406 is relocation of all pixels of CameraL according to the lookup table.

FIG. 5 shows the images of FIG. 3 after image space equalization.

Figure 6:
FIG. 6 shows a depth map obtained from rectification of the stereo rig of equalized VIS and SWIR images.

The ISE can be performed on any pair of cameras. The fusion by ISE can be applied on any pair of still images or videos, captured by the cameras. The ISE process above allows to perform stereo rectification, so the image registration will be very easily calculated, since the rectified images need to be only translated along stereo base direction. The ISE process above may be applied in all known fusion methods, and the only error is the rectification error that can be easily handled. In the case of the video, auto-rectification needs to be applied because of possible new misalignments, caused by cameras moving Stereo rectification can now be performed on the pair of space equalized images from the same image space that lead to ability to calculate disparity and depth maps. The stereo rectification is an evaluation of the new camera extrinsic positions such that the optical axes of the cameras will be parallel. The term "extrinsic position" refers to the position of a first camera in the coordinate space of a second camera, i.e. position after rotation and traslation of the first camera-relative to the second camera. The rectification can be achieved by computing a pair of transformation matrices that map the epipoles to a point at infinity. Known methods for image rectification that may be used are described for example in "Quasi-Euclidean Epipolar Rectification", Image Processing On Line, 1 (2011), pp. 187-199, or in "Computing Rectifying Homographies for Stereo Vision", by Microsoft Research, One Microsoft Way, Redmond, WA 98052-6399, USA (1999). These methods assume that the cameras have the same intrinsic parameters, and ISE removes that constraint. FIG. 6 shows a depth map obtained from rectification of the stereo rig of equalized VIS and SWIR images.

Figure 7:
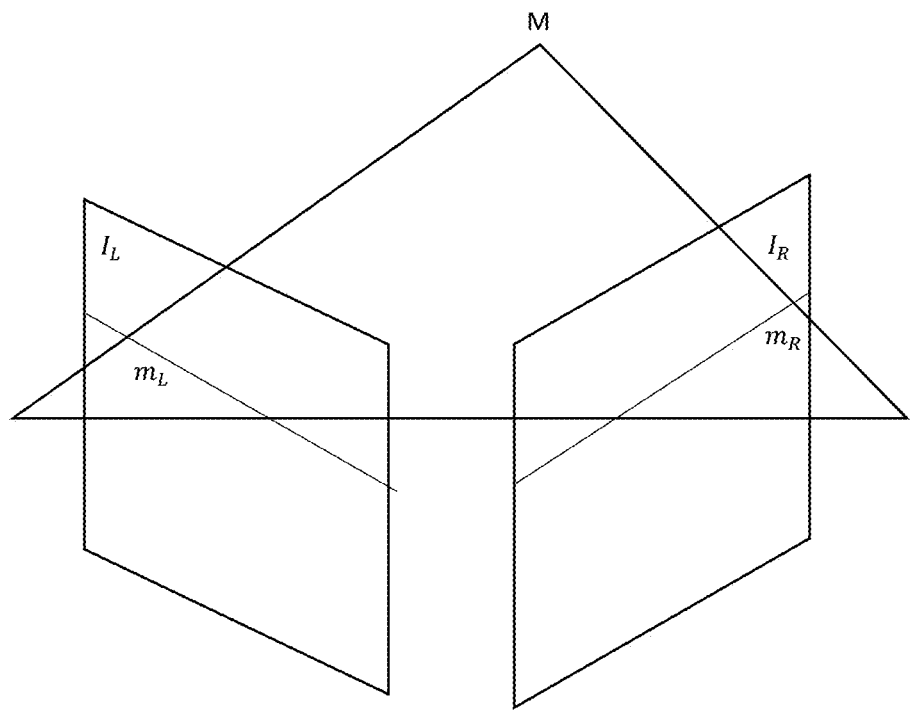
FIG. 7 shows in a schematic description the projection of a common point M on both cameras used to acquire the images in FIG. 1 and FIG. 2 in a known process.

Although the rectification after ISE may be done in well-known ways, it is described next in detail for completeness. The rectification process begins by defining the epipolar geometry between a pair of images (marked next $I_L$ and $I_R$, or as in FIG. 8, I and I'). Let us define the pair of the pin-hole cameras $C_L$ (left camera) and $C_R$ (right camera) in a 3-dimensional (3D) space. Let us define M as a common point, visible from both cameras. We define $m_L$ and $m_R$ as the projections of point M ($m_L$ and $m_R$ are the coordinates in units of pixels) called correspondent points into, respectively, left image $I_L$ and right image $I_R$. The geometry of this definition is shown in FIG. 7. The problem is that $m_L$ and $m_L$ can be anywhere on an epipolar line, FIG. 8.

Figure 8:
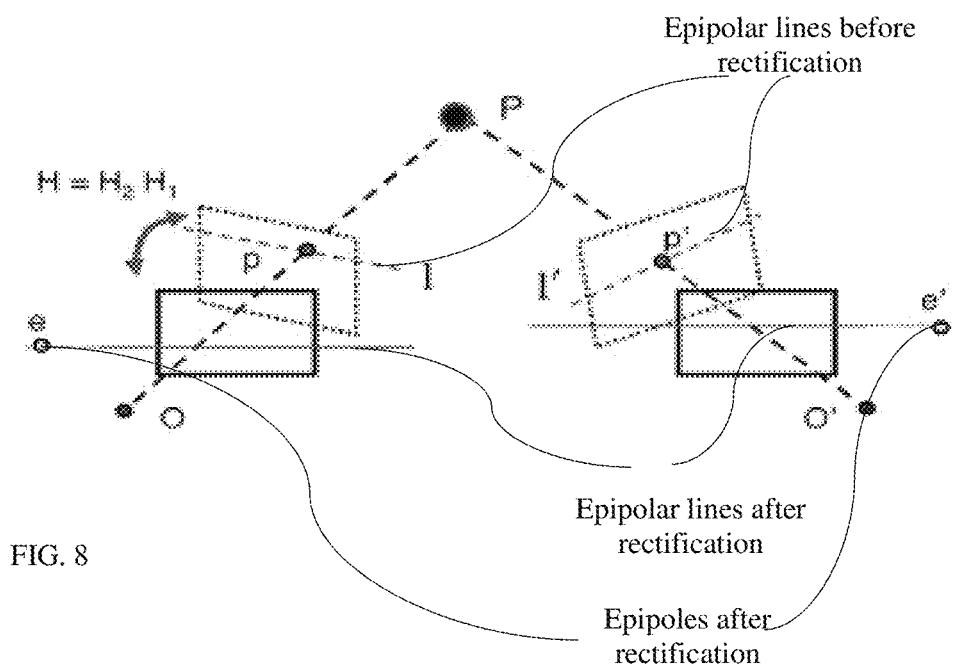
FIG. 8 shows a schematic drawing of the image rectification process in a known process.

As seen in FIG. 8, the epipolar line is the intersection of the plane, defined by point P and optical centers of the left and right cameras with left and right image spaces accordingly. All epipolar lines that belong to different matching points intersect in one point ("epipole"). For each common point P there are two epipolar lines (dashed) as shown. A change in the position of the common point yields new epipolar lines. All distinct epipolar lines before rectification intersect in an epipole (not shown). After rectification, the epipolar lines become parallel and epipoles lie at infinity.

The problem above is expressed by a known epipolar constraint defined as $(m_L)^T F\, m_R = 0$ for all pairs of image correspondences. Matrix F is a "fundamental" matrix, a 3×3 matrix with rank 2 that maps pixels from image $I_L$ to image $I_R$ such that each corresponding point from one camera is mapped onto the epipolar line on the second camera. The fundamental matrix can be estimated directly from intrinsic and extrinsic camera parameters. Intrinsic parameters include for example focal length, principal point, distortion, pixel size in nanometers, sensor physical dimensions in millimeters and, optionally, a skew factor. Extrinsic parameters include for example a rotation matrix and translation vectors of one (e.g. the first) camera relative to another (e.g. the second) camera. There are several known techniques to calculate the fundamental matrix.

The new orientation of the left and right camera with respect to world coordinates is explained with reference to FIG. 8. In the figure, H1 is a projective transformation that rotates the first image to be perpendicular to the baseline connecting O and O'. H2 is the projective transformation that takes the rotated image and twists it so that the horizontal axis aligns with the baseline. Finally H=H2·H1. H is defined as the rectification transformation of the (left) image I.

Following the rectification process, stereo matching is performed, benefitting from the ISE. Stereo matching is used to recover 3D depth information from at least two images captured from different point of views. One of the major problems here is a correspondent problem—find the matching between the different projections of the same point in real space. If a point in one image is given, its corresponding point must lie on the epipolar line in the other image. If the two cameras are placed side by side on the same baseline and have the same intrinsic parameters, then the obtained images are known as a rectified pair of stereo images. On these images, matching points must lie on a same horizontal line. So the solution of the problem is to calculate a pair of warping transforms for a pair of stereo images that convert the epipolar geometry to the ideal state which has been described above (i.e. the state where all epipolar lines are parallel and the epipoles lie at infinity).

In conclusion, known methods dealing with what problem of ghost images in images fused after acquisition with two cameras with different type sensors involve iterative non-linear optimizations that lead to heavy computations. The ISE process disclosed herein allows to omit the heavy calculation routines needed in such known methods. By defining a lookup table and including an ISE process, the complexity is only O(mn), where m×n is the dimension of CameraR, instead of at least O(kmn) of any other iterative non-linear method, where k is number of iterations, which is commonly inversely proportional to a desired accuracy. Therefore, we return the solution of the problem of ghost images in images fused after acquisition with two cameras with different type sensors back into solution by all known methods for the equal cameras with low computing cost, as mentioned above.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

Citation or identification of any reference in this application shall not be construed as an admission that such reference is available as prior art to the present disclosure.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A method for fusing images from two different cameras, a first camera and a second camera, the method comprising:
   a) performing a transformation that translates an image space of the first camera into an image space of the second camera to obtain a stereo rig in the form of a pair of space equalized images, the transformation comprising:
      (i) calculating coordinates of each pixel in a sensor space of a pin-hole model of the second camera that has a second image sensor with a second resolution that is lower than a first resolution of a first image sensor of the first camera,
      (ii) based on the calculated coordinates, transforming a sensor space of the first camera that has the first image sensor with the first resolution into the image space of the second camera that has the second image sensor with the second resolution that is lower than the first resolution by calculating new pixel coordinates u, v in the first camera corresponding to new pixel positions in the first camera $x_R y_R$ using the transformation $$u(x_R) = p_R + \frac{(x_R - p_R) \cdot F_L \cdot H_R}{F_R \cdot H_L}$$

$$v(y_R) = q_R + \frac{(y_R - q_R) \cdot F_L \cdot W_R}{F_R \cdot W_L}$$

wherein $H_L$, $W_L$ are respectively a height and a width of the first image sensor, $H_R$, $W_R$ are respectively a height and a width of the second image sensor, $p_R$, $q_R$ are pixel positions of a principal point of the second camera in respectively horizontal and vertical directions, $F_L$ is a pixel relative focal length of the first camera and $F_R$ is a pixel relative focal length of the second camera, and
(iii) setting up positions of image pixels of the first camera in the image space of the second camera to obtain the pair of space equalized images;
b) performing rectification on the pair of space equalized images to obtain rectified first and second images;
c) performing registration on the rectified first and second images to obtain registered first and second images; and
d) fusing the registered first and second images into a fused image.

2. The method of claim 1, wherein the first camera differs from the second camera in at least one parameter selected from focal length, distortion, gain and spectral range.

3. The method of claim 1, wherein the transforming of the sensor space of the first camera comprises outputting a look-up table of pixel positions correlating between pixels positions of the first sensor and pixel positions of the second image.

4. The method of claim 1, wherein the first camera and the second camera operate in differing spectral ranges.

5. The method of claim 1, wherein the first camera is a visible (VIS) range camera sensitive in the VIS spectral range and wherein the second camera is a short-wave infrared (SWIR) camera sensitive in the SWIR range.

6. The method of claim 1, wherein the performing of the rectification comprises rectifying the pair of space equalized images that originate from the first image sensor and the second image sensor which differ in at least their resolution and spectral range to obtain the rectified first and second images.

7. The method of claim 1, wherein the performing of the registration comprises performing registration on the rectified first and second images that originate from the first image sensor and the second image sensor which differ in at least their resolution and spectral range to obtain the registered first and second images.

\* \* \* \* \*